(12) United States Patent  
Zermas

(10) Patent No.: US 11,127,165 B1  
(45) Date of Patent: Sep. 21, 2021

(54) REGISTRATION OF SINGLE CHANNEL IMAGE SENSORS

(71) Applicant: Sentera, Inc., Minneapolis, MN (US)

(72) Inventor: Dimitris Zermas, Minneapolis, MN (US)

(73) Assignee: Sentera, Inc., Minneapolis, MN (US)

(*) Notice: Subject to any disclaimer, the term of this patent is extended or adjusted under 35 U.S.C. 154(b) by 0 days.

(21) Appl. No.: 16/700,489

(22) Filed: Dec. 2, 2019

(51) Int. Cl.
| | |
|---|---|
| *G06T 7/90* | (2017.01) |
| *H04N 7/00* | (2011.01) |
| *H04N 9/00* | (2006.01) |
| *H04N 7/18* | (2006.01) |
| *H04N 9/64* | (2006.01) |

(52) U.S. Cl.
CPC ............ *G06T 7/90* (2017.01); *H04N 7/185* (2013.01); *H04N 9/646* (2013.01); *G06T 2207/10036* (2013.01); *G06T 2207/10048* (2013.01); *G06T 2207/30188* (2013.01)

(58) Field of Classification Search
None
See application file for complete search history.

(56) References Cited

U.S. PATENT DOCUMENTS

| | | | |
|---|---|---|---|
| 2002/0051578 A1* | 5/2002 | Imagawa | G06K 9/4609 382/224 |
| 2020/0075652 A1* | 3/2020 | Chen | H01L 27/14621 |
| 2020/0077601 A1* | 3/2020 | McCall | B64C 39/024 |

* cited by examiner

*Primary Examiner* — Edemio Navas, Jr.
(74) *Attorney, Agent, or Firm* — Hamre, Schumann, Mueller & Larson, P.C.

(57) ABSTRACT

An aerial imaging system is disclosed. The aerial imaging system includes an aerial vehicle; a camera system mounted on the aerial vehicle; and an image storage medium. The camera system includes a lens and a plurality of image sensors. The plurality of image sensors includes a reference image sensor and a plurality of fixed wavelength sensors. The reference image sensor is configured to capture images including light at a plurality of wavelength ranges and to output a multilayer image. The plurality of fixed wavelength sensors are each configured to capture images including light at a selected wavelength range and to each output a single layer image. The image storage medium is configured to store the multilayer image and the plurality of single layer images.

18 Claims, 4 Drawing Sheets

REGISTRATION OF SINGLE CHANNEL IMAGE SENSORS

FIELD

This disclosure relates generally to imaging from aerial vehicles such as, but not limited to, unmanned aerial vehicles (UAVs). More specifically, this disclosure relates to registration of images captured synchronously from a camera on an aerial vehicle.

BACKGROUND

Cameras have become a common tool used in aerial imaging applications such as in precision agriculture applications. Precision agriculture seeks to improve farming management through the use of image analysis. It is known to use unmanned aerial vehicles (UAVs) to fly over agricultural fields and capture images of the fields. The images are then analyzed to make determinations about the agricultural fields, for example the health of crops growing in the fields, the type of crops, the number of crops, soil conditions, the presence of insects or animals, and the like. By photographing plants and isolating various light spectra, it is possible to learn more about the health of the plants than could be gained with the naked eye.

SUMMARY

This disclosure relates generally to imaging from aerial vehicles such as, but not limited to, unmanned aerial vehicles (UAVs). More specifically, this disclosure relates to registration of images captured synchronously from a camera on an aerial vehicle.

This disclosure relates generally to precision agriculture. More specifically, this disclosure relates to registration of images captured synchronously from a camera in precision agriculture.

An aerial imaging system is disclosed. The aerial imaging system includes an aerial vehicle; a camera system mounted on the aerial vehicle; and an image storage medium. The camera system includes a lens and a plurality of image sensors. The plurality of image sensors includes a reference image sensor and a plurality of fixed wavelength sensors. The reference image sensor is configured to capture images including light at a plurality of wavelength ranges and to output a multilayer image. The plurality of fixed wavelength sensors are each configured to capture an image including light at a selected wavelength range and to each output a single layer image. The image storage medium is configured to store the multilayer image and the plurality of single layer images.

Another aerial imaging system is disclosed. The aerial imaging system includes an aerial vehicle; a camera system mounted on the aerial vehicle; and an image storage medium. The camera system includes a lens; and a red-green-blue (RGB) reference image sensor configured to capture a multilayer image; and a red image sensor, a green image sensor, a blue image sensor, a red edge image sensor, and a near infrared image sensor. The red image sensor, green image sensor, blue image sensor, red edge image sensor, and near infrared image sensor are collectively configured to capture a plurality of single layer images each including light having a wavelength between 380 nanometers and 900 nanometers. An image storage medium is configured to store the multilayer image and the plurality of single layer images.

A method of generating a multispectral image is also disclosed. The method includes launching an aerial vehicle and capturing a plurality of photographic images of an agricultural field using a camera on the aerial vehicle. The camera includes a plurality of image sensors and a reference image sensor. The plurality of image sensors are each configured to capture photographic images including light at different wavelength ranges and each configured to output a single layer photographic image. The reference image sensor is configured to capture photographic images including light at a plurality of wavelength ranges and is configured to output a multilayer photographic image. The plurality of photographic images is stored in an image storage medium of the aerial vehicle.

BRIEF DESCRIPTION OF THE DRAWINGS

References are made to the accompanying drawings that form a part of this disclosure, and which illustrate embodiments in which the systems and methods described in this specification can be practiced.

Like reference numbers represent like parts throughout.

DETAILED DESCRIPTION

This disclosure relates generally to imaging from aerial vehicles such as, but not limited to, unmanned aerial vehicles (UAVs). More specifically, this disclosure relates to registration of images captured synchronously from a camera on an aerial vehicle.

The registration of images from different light spectra captured synchronously is challenging. Generally, the individual images being registered are dissimilar due to the different light spectra captured. The different light spectra can present challenges because the images captured have variations in texture and illumination values of their respective pixels.

An aerial vehicle will be described as an unmanned aerial vehicle (UAV), with a camera system mounted on the UAV. The camera system will be described as being used to image plants, in particular corn, growing in a field(s). However, the techniques described herein are not limited to imaging corn plants, and the camera system can be used to image other types of plants as well as soil conditions in an agricultural field. The techniques described herein may also be used in non-agronomy applications, for example imaging and analyzing non-agricultural plants such as trees.

Image registration, or simply "registration," is the process of aligning two or more images of the same scene. This process involves designating one image as the reference image, also called the fixed image, and applying geometric transformations or local displacements to the other images so that they align with the reference.

A multispectral camera includes a camera that captures image data within specific wavelength ranges across the electromagnetic spectrum. In an embodiment, the multispectral camera can capture image data within the visible spectrum, within the near infrared spectrum, or combinations thereof. In an embodiment, a multispectral camera can include a single camera having a plurality of camera sensors each dedicated to capturing a subset of wavelengths in the electromagnetic spectrum. In an embodiment, a multispectral camera can include a plurality of cameras each having a camera sensor dedicated to capturing a subset of wavelengths in the electromagnetic spectrum.

The visible spectrum includes a portion of the electromagnetic spectrum that is visible to the human eye.

The near infrared spectrum includes a portion of the electromagnetic spectrum that borders the visible spectrum on the infrared side of the electromagnetic spectrum.

In an embodiment, a combination of the visible spectrum and the near infrared spectrum includes light having wavelengths in a range at or about 380 nanometers (nm) to at or about 900 nm. It is to be appreciated that these numbers are examples and that the actual values can range slightly beyond the 380 nm and 900 nm values.

Figure 1:
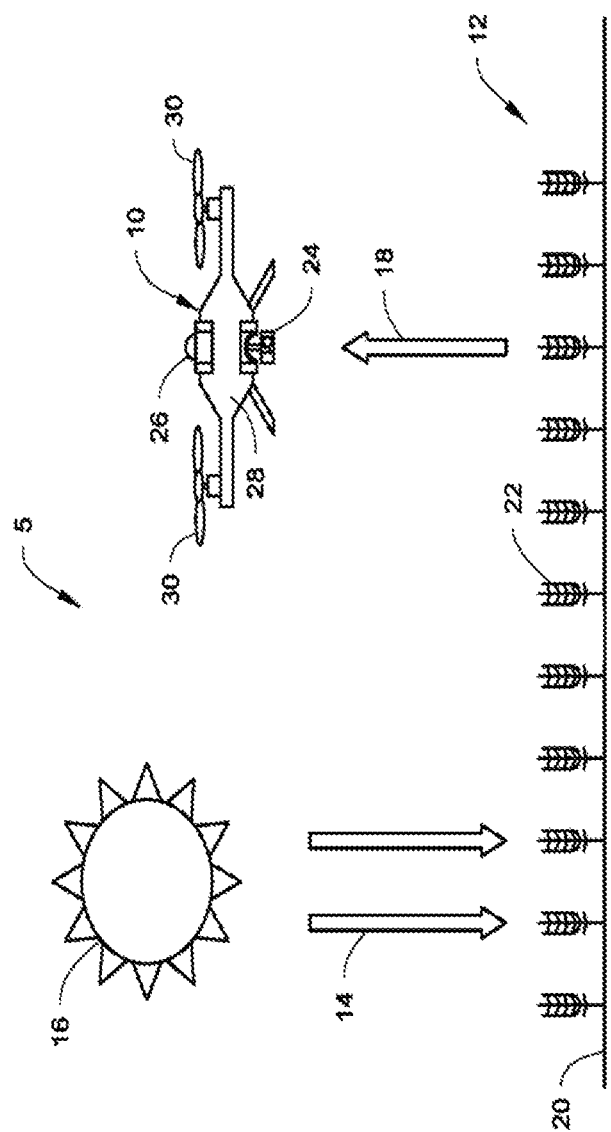
FIG. 1 is an example environment in which the precision agriculture techniques described in this Specification can be implemented, according to an embodiment.

FIG. 1 illustrates an example environment 5 where a UAV 10 is used to gather images of an agricultural field 12 by flying over the field 12. The operation of the UAV 10 can be autonomous (i.e., not controlled from the ground by a ground control station during flight); semi-autonomous; or remotely controlled in flight by the ground control station. The UAV 10 can be, for example, a precision agriculture UAV, or alternatively, a precision agriculture aerial vehicle.

In the illustrated example, the field 12 includes soil 20 and plants/crops 22 growing in the soil 20. A camera system 24 (also referred to as an imaging system or an image capture device) is mounted on the UAV 10. The camera system 24 captures images of the field 12 which can then be analyzed as described herein. It is to be appreciated that the camera system 24 can include one or more cameras disposed on a bottom side of the UAV 10, one or more cameras disposed on a top side of the UAV 10 (not shown in FIG. 1), or combinations thereof. In an embodiment, the camera system 24 can include three cameras on the bottom side of the UAV 10 and three cameras on the top side of the UAV 10.

In an embodiment, the systems and methods described in this Specification can be utilized to analyze plants within, for example, the agricultural field 12 and extract information characterizing chlorophyll concentration which can be correlated to plant health. It is to be appreciated that characterizing chlorophyll concentration is one example and that other uses can include, but are not limited to, detecting stress on the plants; determining a concentration of water in the plants; identifying the species of the plants; or the like.

Figure 2:
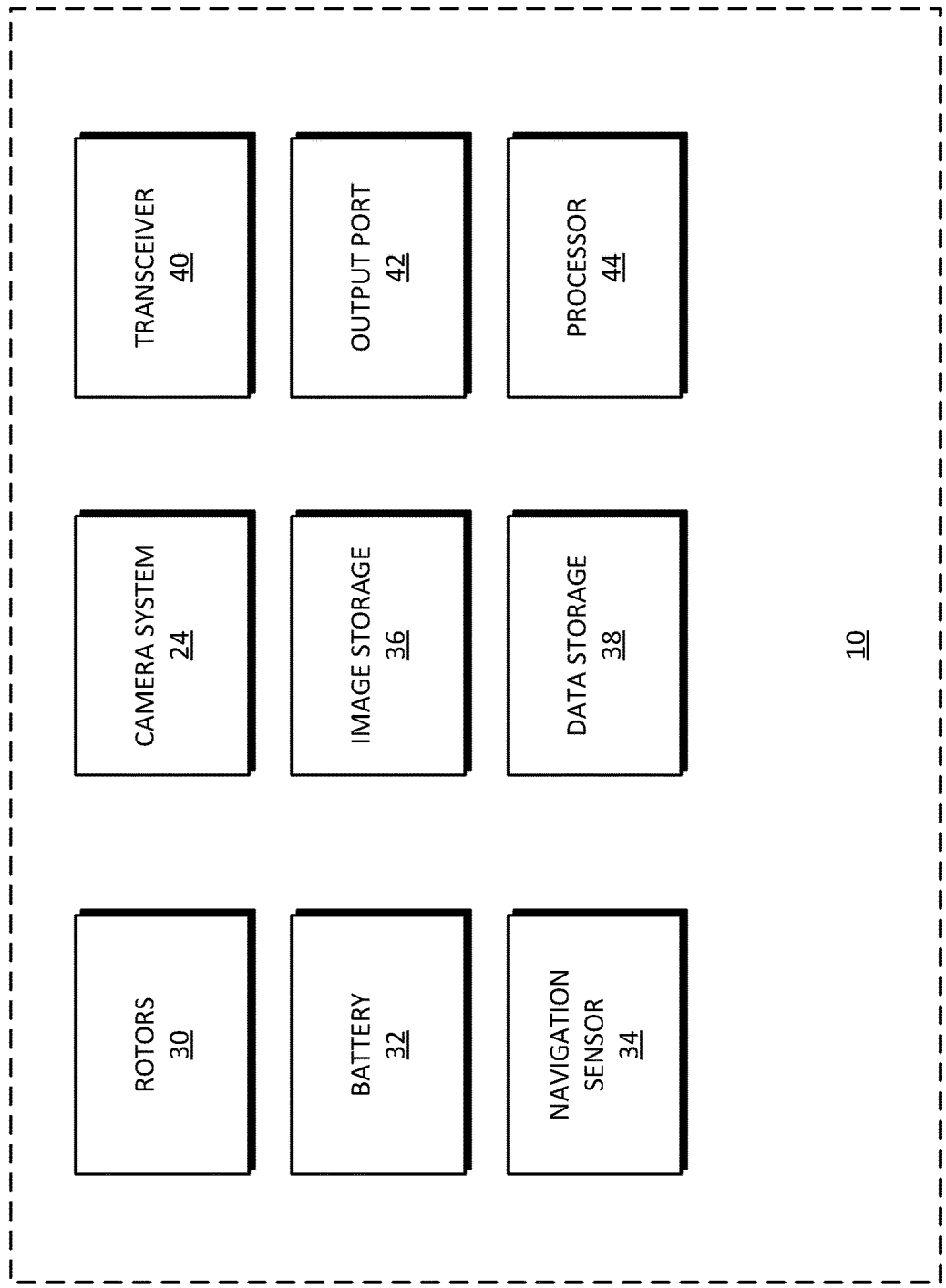
FIG. 2 is a schematic diagram of example components of an unmanned aerial vehicle (UAV) as described in this Specification, according to an embodiment.

With reference to FIGS. 1 and 2, the UAV 10 itself can be of conventional construction including a central fuselage 28 to which the camera system 24 is mounted, a plurality of, for example four, rotors 30, one or more batteries 32 (which may be rechargeable), and a navigation sensor 34.

Image data from the camera system 24 can be stored in image storage 36. Other data, for example location data from the navigation sensor 34, can be stored in data storage 38 (or stored in the image storage 36). In an embodiment, the image data may be wirelessly transmitted from the UAV 10 to a ground control station (not illustrated) or other receiving entity using an optional transceiver 40. In addition, the UAV 10 can include an output port 42, for example a USB port, a removable SD card, or a combination thereof, for downloading image data from the UAV 10 via a wired connection.

The rotors 30 rotate to provide lift and propulsion for the UAV 10. The battery 32 provides stored electrical energy for powering the various electrical components of the UAV 10.

The navigation sensor 34 may include an inertial measurement unit (IMU), which may include an accelerometer and gyroscope to output UAV 10 roll, pitch, yaw, acceleration, or approximate velocity calculated based on acceleration.

The navigation sensor 34 may include a compass to provide heading or a global navigation satellite system (GNSS), such as the Global Positioning System (GPS) to provide location. In an example, the navigation sensor 34 may include a tightly coupled IMU and GNSS system, where the IMU data is used to reduce noise in the GNSS positioning accuracy and the GNSS data is used to reduce inertial positioning noise (e.g., drift).

The transceiver 40 (if provided) can be any conventional transceiver known in the art for wirelessly transmitting and receiving data/commands. The camera system 24, the one or more rotors 30, the one or more batteries 32, the navigation sensor 34, the storage 36, 38, and the transceiver 40 are each well known in the art.

The UAV 10 includes a processor 44 that can control various functions of the UAV 10, including the flight of the UAV 10, control of the camera system 24, processing of image data stored in the image storage 36, or the like. The processor 44 can be a single processor, multiple processors, or a single processor having multiple processing cores. In some embodiments, the processor 44 can be a single-threaded processor. In an embodiment, the processor 44 can be a multi-threaded processor.

Figure 3:
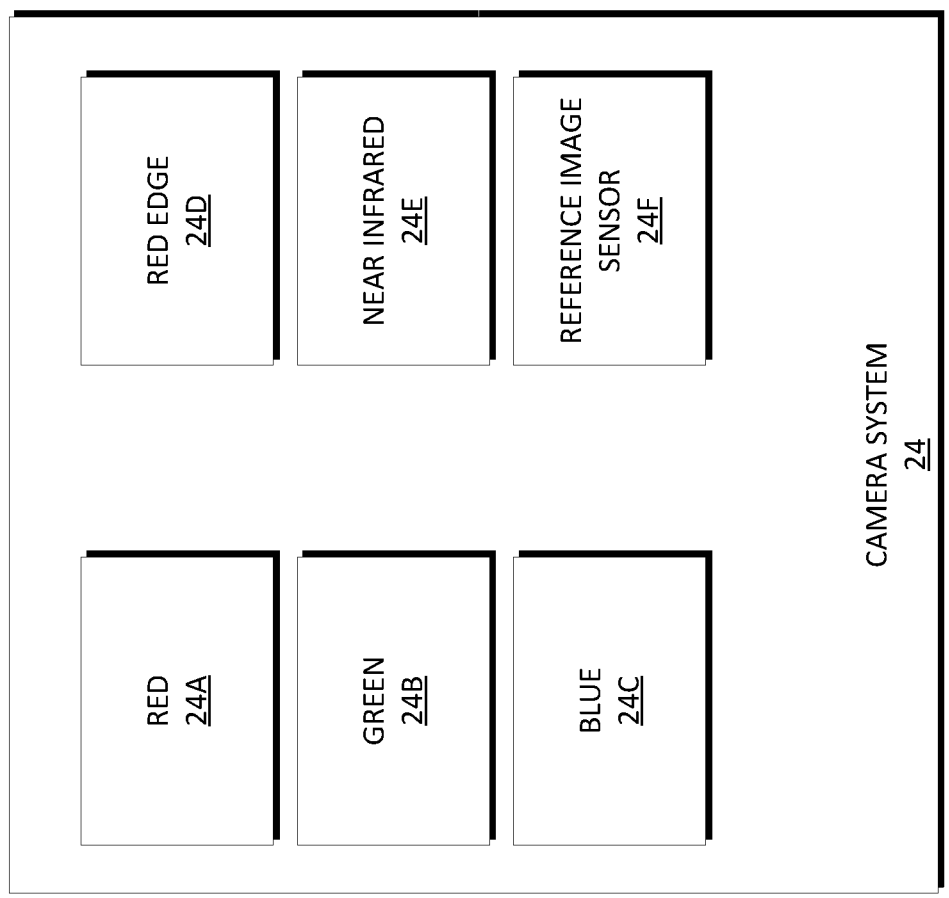
FIG. 3 is a schematic diagram of the camera system 24 from FIGS. 1 and 2 including spectral image sensors, according to an embodiment.

FIG. 3 is a schematic diagram of the camera system 24 (e.g., FIGS. 1, 2) including spectral image sensors 24a-24f, according to an embodiment.

The camera system 24 includes a plurality of image sensors 24a-24f. The number of image sensors 24a-24f is greater than two. Six image sensors 24a-24f are shown. It is to be appreciated that this number is an example and can vary beyond six.

Each of the image sensors 24a-24e is capable of capturing an image including light of a selected wavelength. Capturing an image can alternatively be referred to as capturing a photographic image. Collectively, the image sensors 24a-24e are capable of capturing images including light having a wavelength from at or about 380 nanometers (nm) to at or about 900 nm.

One of the plurality of image sensors 24a-24f, in the illustrated embodiment image sensor 24f, is configured to be a reference image sensor. In an embodiment, more than one reference image sensor 24f can be present. The reference image sensor 24f is configured to capture an image including light at a range of wavelengths that is otherwise covered by the image sensors 24a-24e. For example, the reference image sensor 24f can be configured to be an RGB sensor that captures images including light at red, green, and blue wavelengths. In an embodiment, the reference image sensor 24f can capture images including light at two ranges (e.g., RG, RB, GB). The reference image sensor 24f can capture images including light covering at least two wavelength ranges. The capability of the reference image sensor 24f determines which of the image sensors 24a-24e is present. For example, if the reference image sensor 24f is an RG sensor, the images sensors 24a-24e may include the red image sensor 24a and the green image sensor 24b, but not include the blue image sensor 24c. In an embodiment, the reference image sensor 24f does not capture the exact same light spectra as the other image sensors 24a-24e. In an embodiment, capturing light spectra whose images show similarities between the reference image sensor 24f and the other image sensors 24a-24e may be sufficient. Even limited similarities in the images may be sufficient for the registration.

The reference image sensor 24f is configured to output an image having a plurality of layers. The remaining image sensors 24a-24e are each configured to output an image having a single layer. In an embodiment, the remaining image sensors 24a-24e can alternatively be configured to output an image having a plurality of layers. For example, the reference image sensor 24f is [Red, Green, Blue] and another sensor 24a is [Red, Red Edge, Near Infrared]. The images output by the two image sensors 24a, 24f can be performed using the common red channel (or using the Red Edge that is similar to the Red), therefore resulting in a registered image including 5 layers [Red, Green, Blue, Red Edge, Near Infrared].

The image sensors 24a-24f are configured to synchronously capture images when, for example, the UAV 10 is in flight. When synchronously capturing the images, the images may be captured at an interval of at or about 10 milliseconds (ms) or less. In an embodiment, the images may be captured at an interval between at or about 5 ms and at or about 10 ms. It is to be appreciated that the actual time interval is dependent upon factors such as the speed of the UAV 10. In an embodiment, the time interview is selected so that there are common points in the captured images so that the registration of the images is possible.

In an embodiment, the image sensors 24a-24f can have different resolutions. In such an embodiment, the resolution of one of the image sensors 24a-24f can be selected and the remaining images captured at the same resolution so that there is a 1:1 pixel correspondence between the various images, which can simplify identification of matching points across the various images. In an embodiment, the selected resolution can be the lowest resolution.

Subsequent to the capturing of the images from each of the image sensors 24a-24f (including the reference image sensor 24f), the images can be combined into a multilayer image by registering each of the images. In the illustrated embodiment, the resulting image (i.e., the registered multilayer image) can be a 5-layer image utilizing the layers from the image sensors 24a-24e. The multilayer image from the reference image sensor 24f is utilized in the registration of the individual images.

In an embodiment, the registered multilayer image prepared from the registration of the single layer images can be performed directly by the camera system 24 on the UAV 10. In an embodiment, the registered multilayer image prepared from the registration of the single layer images can be performed separately from the UAV 10 such as, subsequent to the image data being electronically transferred from the image storage 36 to another processing device.

In an embodiment, there should be at least 4 common points across each of the images to complete the registration. Registration may be possible using 2 or 3 common points, though the registration may be less accurate than when performed with at least 4 common points. In an embodiment, the multilayer image is smaller than the input images. This can be, for example, a result of cropping the individual single layer images. For example, non-overlapping regions of the single layer images can be cropped from the image so that the resulting multilayer image includes only the overlapping regions. Images may be cropped so that the final multilayered image has values from all individual images for each one of its pixels. In an embodiment, it may be possible to not crop the individual images, but some pixels at the edges may be missing values relative to the individual images.

Figure 4:
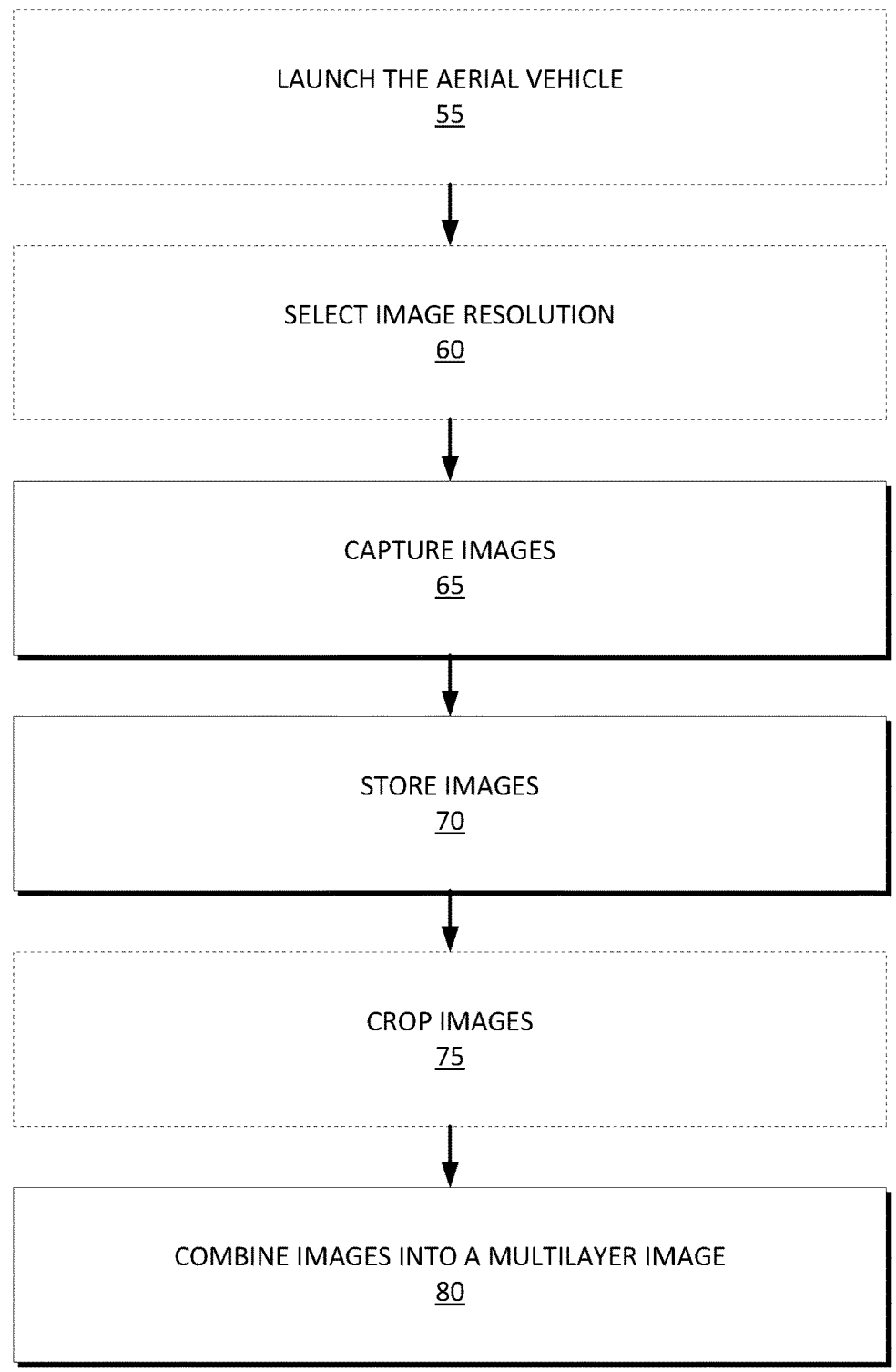
FIG. 4 is a flowchart for a method of capturing a multispectral image, according to an embodiment.

FIG. 4 is a flowchart for a method 50 of generating a multispectral image, according to an embodiment.

The method 50 can begin with the launching of the UAV 10 at 55. The launching of the UAV 10 is shown as optional because the UAV 10 may already be in flight when the method 50 is executed.

At 60, the camera system 24 sets a resolution for the plurality of image sensors (e.g., image sensors 24a-24f). In an embodiment, the camera system 24 can set the resolution of the plurality of image sensors to being the same as the lowest resolution of the plurality of image sensors 24a-24f within the camera system 24.

At 65 the camera system 24 captures a plurality of images using each of the plurality of image sensors 24a-24f. The image capturing at 65 occurs synchronously. In an embodiment, there may be a time interval between capturing of each of the individual images of the plurality of images. This includes synchronously capturing images from the plurality of image sensors 24a-24f. In an embodiment, the images can be captured at an interval of at or about 10 milliseconds (ms) or less. In an embodiment, the images may be captured at an interval between at or about 5 ms and at or about 10 ms. It is to be appreciated that the actual time interval is dependent upon factors such as the speed of the UAV 10. In an embodiment, the time interval is selected so that there are common points in the captured images so that the registration of the images is possible.

At 70, the images are stored in the image storage 36. Optionally, at 75, the images can be cropped. The UAV 10 is in flight as the images are captured at 65. As a result of the movement of the UAV 10 and the synchronous capturing of the images, the captured images include portions that are overlapping (e.g., in all of the images) and portions that are non-overlapping (e.g., a portion that is not in other images). The non-overlapping portions are not needed for registering the captured images to form a multilayer image. As such, the non-overlapping portions are removed from each of the captured images.

At 80, image registration is performed to form a multilayer image. The image registration can be performed in flight by the processor 44 on the UAV 10. In an embodiment, the image registration can be performed subsequent to landing the UAV 10 (e.g., on the ground). In an embodiment, the image registration can be performed remotely from the UAV 10. For example, the image data as stored in the image storage 36 can be transmitted from the UAV 10 to another computer for registration. The image registration can utilize many techniques including, but not limited to, detection and matching of key points (e.g., pixels with unique identifying properties including, but not limited to, texture, color, and illumination), through the matching of image patches having similarities (e.g., similar sizes, texture, color, illumination, etc.), suitable combinations thereof, or the like.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. An aerial imaging system, comprising:
    an aerial vehicle;
    a camera system mounted on the aerial vehicle, the camera system including:
        a lens; and
        a plurality of image sensors, the plurality of image sensors includes:
            a reference image sensor configured to capture images including light at a plurality of wavelength ranges, the reference image sensor configured to output a multilayer image; and
            a plurality of fixed wavelength sensors each configured to capture an image including light at a selected wavelength range and each configured to output a single-layer image; and
    a first processor on the aerial vehicle and connected to the camera system that controls the camera system so that the plurality of image sensors are controlled to synchronously capture images;
    an image storage medium configured to store the multilayer image and the plurality of single-layer images; and
    one of the following:
        the first processor is configured to register each of the single-layer images to produce a registered multilayer image using the multilayer image as a reference;
        a second processor separate from the aerial vehicle that is configured to register each of the single-layer images to produce a registered multilayer image using the multilayer image as a reference.

2. The aerial imaging system of claim 1, wherein the reference image sensor is configured to capture images including light at a wavelength range that includes the selected wavelength range of at least two of the plurality of fixed wavelength sensors.

3. The aerial imaging system of claim 1, wherein the camera system includes a plurality of lenses, each of the plurality of lenses configured to include one of the plurality of image sensors.

4. The aerial imaging system of claim 1, wherein the reference image sensor includes a red, green, blue (RGB) image sensor, and the multilayer image is a three-layer image.

5. The aerial imaging system of claim 1, wherein the reference image sensor includes at least two image sensors, the reference image sensor configured to capture a two-layer image.

6. The aerial image system of claim 1, wherein the plurality of image sensors are configured to capture images including light having a wavelength from 380 to 900 nanometers.

7. The aerial image system of claim 1, wherein the plurality of image sensors are configured to capture light in one or more of the visible spectrum, the red edge spectrum, and the near infrared spectrum.

8. The aerial image system of claim 1, wherein the aerial vehicle is a precision agriculture aerial vehicle.

9. The aerial image system of claim 1, wherein the aerial vehicle is an unmanned aerial vehicle.

10. The aerial imaging system of claim 1, wherein the first processor controls the camera system so that the plurality of image sensors are controlled to synchronously capture images at an interval of 10 milliseconds or less.

11. An aerial imaging system, comprising:
    an aerial vehicle;
    a camera system mounted on the aerial vehicle, the camera system including:
        a lens; and
        a red-green-blue (RGB) reference image sensor configured to capture a multilayer image; and
        a red image sensor, a green image sensor, a blue image sensor, a red edge image sensor, and a near infrared image sensor, separate from the RGB reference image sensor and collectively configured to capture a plurality of single layer images each including light having a wavelength between 380 nanometers and 900 nanometers; and
    a controller connected to the camera system that controls the camera system so that the RGB reference image sensor, the red image sensor, the green image sensor, the blue image sensor, the red edge image sensor, and the near infrared image sensor are controlled to synchronously capture the multilayer image and the plurality of single layer images;
    an image storage medium configured to store the multilayer image and the plurality of single layer images.

12. The aerial imaging system of claim 11, wherein the aerial vehicle is an unmanned aerial vehicle.

13. The aerial imaging system of claim 11, wherein the controller controls the camera system so that the RGB reference image sensor, the red image sensor, the green image sensor, the blue image sensor, the red edge image sensor, and the near infrared image sensor are controlled to synchronously capture images at an interval of 10 milliseconds or less.

14. A method of generating a multispectral image, comprising:
    launching an aerial vehicle;
    capturing a plurality of photographic images of an agricultural field using a camera on the aerial vehicle, the camera including a plurality of image sensors and a reference image sensor, the plurality of image sensors each configured to capture photographic images including light at different wavelength ranges and each configured to output a single-layer photographic image, the reference image sensor configured to capture photographic images including light at a plurality of wavelength ranges and configured to output a multilayer photographic image;
    controlling the camera system so that the plurality of image sensors and the reference image sensor synchronously capture the respective photographic images; and
    storing the plurality of photographic images in an image storage medium of the aerial vehicle; and
    combining the plurality of single-layer photographic images into a registered multilayer photographic image using the multilayer photographic image as a reference.

15. The method of claim 14, wherein the agricultural field includes a plurality of plants and the capturing of the plurality of photographic images includes capturing photographic images of the plurality of plants.

16. The method of claim 14, wherein the aerial vehicle is an unmanned aerial vehicle.

17. The method of claim 14, further comprising cropping the plurality of photographic images.

18. The method of claim 14, comprising controlling the camera system to synchronously capture the respective photographic images at an interval of 10 milliseconds or less.

* * * * *